United States Patent
Kurosawa et al.

(10) Patent No.: US 6,958,556 B2
(45) Date of Patent: Oct. 25, 2005

(54) STRUCTURE OF ROTORS IN STEPPING MOTORS

(75) Inventors: Soichi Kurosawa, Kitasaku-gun (JP); Akio Kanazawa, Kitasaku-gun (JP); Naohiro Yoshida, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 10/394,159

(22) Filed: Mar. 24, 2003

(65) Prior Publication Data
US 2003/0184166 A1 Oct. 2, 2003

Related U.S. Application Data

(63) Continuation of application No. 09/960,927, filed on Sep. 25, 2001, now abandoned.

(30) Foreign Application Priority Data
Sep. 28, 2000 (JP) ............................ 2000-296600

(51) Int. Cl.$^7$ .......................................... H02K 37/24
(52) U.S. Cl. .............................. 310/49 R; 310/156.12; 310/156.25; 310/156.42; 310/112; 310/216; 310/254
(58) Field of Search ...................... 310/156.01, 156.08, 310/156.12, 156.25, 156.38, 156.42, 156.43, 310/156.44, 49 R, 216–218, 254, 258, 259, 310/112–114

(56) References Cited

U.S. PATENT DOCUMENTS

| RE25,445 E | * | 9/1963 | Fredrickson ................. 310/163 |
| 3,978,356 A | | 8/1976 | Spiesberger ............ 310/156.42 |
| 4,009,406 A | | 2/1977 | Inariba .......................... 310/12 |
| 4,406,958 A | | 9/1983 | Palmero et al. ......... 310/156.64 |
| 4,503,368 A | * | 3/1985 | Sakamoto .................. 310/49 R |
| 4,695,419 A | * | 9/1987 | Inariba ......................... 264/259 |
| 6,489,696 B2 | * | 12/2002 | Sashino et al. ................ 310/43 |

FOREIGN PATENT DOCUMENTS

JP A 10-080124 3/1998

* cited by examiner

Primary Examiner—Dang Le
(74) Attorney, Agent, or Firm—Oliff & Berridge, PLC

(57) ABSTRACT

A stepping motor having a rotor that includes a magnetic component whose circumferential part is magnetized in multipole along the circumferential surface thereof, the stepping motor being capable of forcing the rotor to rotate by magnetic force provided between magnetic poles of the rotor and excited salient poles of a stator, in which the magnetic component includes two magnetic component portions each shaped as an approximate ring, and the two magnetic component portions are either combined with each other or set up separately at an appropriate spacing between them. The stepping motor is capable of rotating with not only high speed but also less undesired vibration and noises, and enabling a simpler, smaller manufacturing equipment thereof to be constructed.

3 Claims, 12 Drawing Sheets

STRUCTURE OF ROTORS IN STEPPING MOTORS

This is a Continuation of application Ser. No. 09/960,927 filed Sep. 25, 2001, now abandoned. The entire disclosure of the prior application is hereby incorporated by reference herein in its entirety.

BACKGROUND OF THE INVENTION

1. Field of the Invention

The present invention relates to a structure of a rotor in a stepping motor, widely used for paper-feeders in facsimiles and scanners in copying machines.

2. Description of the Related Art

An example of prior art is a stepping motor having a rotor comprising a permanent magnet between two rotating components that are held by the rotor axis at an appropriate spacing, and one of the rotating component is magnetized as N-pole and the other as S-pole (see FIG. 4 in Japanese Patent Laid-open No. Hei 10-80124), or stepping motors having a rotor comprising a cylindrical permanent magnet with multi-polar magnetic parts arranged around the circumference thereof (see FIGS. 1 and 2 in the above-mentioned Japanese Patent), or a configuration as shown in FIGS. 14A and 14B.

The stepping motor shown in FIG. 14A has a stator yoke 42 in a housing 41, and enables a rotor 44 to rotate by bearings 43a and 43b. The stator yoke is wound by a coil 46 connected with lead wire 45 to an electric circuit (not shown).

The rotor 44 includes a rotor axis 47, rotor components 48a and 48b where a plurality of thin steel plates shaped as an approximate gear are stacked at a predetermined spacing and fixed on the rotor axis 47, and magnet 49, as shown in FIGS. 14A and 14B.

Meanwhile, one of the prior art, for example, (as disclosed in FIG. 4 of the above-mentioned Japanese Patent), wherein a permanent magnet is provided between two rotor components, is apt to make undesired vibration and/or noises because such a structure has magnetic salient portions (teeth) on the circumferential portion. The vibration and noises are also problems found in a prior art shown in FIGS. 14A and 14B. With regard to the stepping motor having a rotor provided with a cylindrical permanent magnet with multi-polar magnetic parts arranged around the circumferential surface thereof (disclosed in FIGS. 1 and 2 of the above-mentioned Japanese Patent), this prior art is designed to eliminate vibration and noise problems.

Though concerned conventional stepping motors have a cylindrical permanent magnet, they have only one cylindrical permanent magnet in their rotors, thereby not only applicable driving force would be limited to only three-phase type, but also the apparatus to magnetize the rotors must be larger because the axial length of the permanent magnet is usually long.

SUMMARY OF THE INVENTION

Coping with above stated problems, the present invention is to provide a structure of a rotor in stepping motors capable of not only rotating much faster, but also eliminating undesired vibration and noises even under rotation at high speed.

Another object of the present invention is to provide the structure of rotor capable of performing with two-phase type, and in addition, a simpler and more cost-effective motor manufacturing equipment can be built.

According to a first aspect of the present invention, there is provided a structure of a rotor in a stepping motor having a rotor comprising magnetic component whose circumferential part is magnetized in multipole along the circumferential surface thereof, the stepping motor being capable of forcing the rotor to rotate by magnetic force provided between magnetic poles of the rotor and excited salient poles of a stator, characterized in that the magnetic component comprises two magnetic component portions each shaped as an approximate ring, and the two magnetic component portions are either combined with each other or set up separately at appropriate spacing inbetween.

According to a second aspect of the present invention, in the first aspect, the two magnetic component portions have a plurality of N-poles and a plurality of S-poles, said N-poles and S-poles each being magnetized alternately at appropriate spacing inbetween, and the N-poles and S-poles are arranged such that contrary poles face each other.

According to a third aspect of the present invention, there is provided a structure of a rotor in a stepping motor having a rotor comprising magnetic component magnetized in its radial direction, the stepping motor being capable of forcing the rotor to rotate by magnetic force provided between magnetic poles of the rotor and excited salient poles of a stator, characterized in that the magnetic component comprises two magnetic component portions each shaped as an approximate gear, and the two magnetic component portions have, on their circumferential surface, convex portions that extend in the axial direction and are disposed at appropriate spacing, and the two magnetic component portions are either combined with each other or set up separately at appropriate spacing inbetween.

According to a fourth aspect of the present invention, in the third aspect, the convex portions are radially magnetized so that the convex portions on one magnetic component portion have the contrary pole to the convex portions on the other magnetic component portion, and said convex portions are so arranged that they are in aligned viewed in the axial direction.

According to a fifth aspect of the present invention, in the third aspect, the two magnetic component portions are magnetized with poles contrary to each other, and the two magnetic component portions have convex portions opposing to concave portions when viewed in the axial direction.

BRIEF DESCRIPTION OF THE DRAWINGS

In the accompanying drawings:

FIG. 2A is a perspective view showing the rotor whose two magnetic component portions are combined with each other in the axial direction, and FIG. 2B is a perspective view showing the rotor whose two magnetic component portions are arranged at an appropriate vacant spacing in the axial direction;

FIG. 3A is a perspective view thereof, and FIG. 3B is a front view thereof;

FIG. 4A is a perspective view thereof, FIG. 4B is a sectional view taken along the line X—X in FIG. 4A, and FIG. 4C is a sectional view taken along the line Y—Y in FIG. 4A;

FIG. 7A is a perspective view showing the rotor whose two magnetic component portions are combined with each other in the axial direction, and FIG. 7B is a perspective view showing the rotor whose two magnetic component portions are arranged at an appropriate vacant spacing in the axial direction;

FIG. 8A is a perspective view showing the rotor whose two magnetic component portions are combined with each other in the axial direction, and FIG. 8B is a perspective view showing the rotor whose two magnetic component portions are arranged at an appropriate vacant spacing in the axial direction;

FIG. 9A is a perspective view showing the rotor whose two magnetic component portions are combined with each other in the axial direction, and FIG. 9B is a perspective view showing the rotor whose two magnetic component portions are arranged at an appropriate vacant spacing in the axial direction;

FIG. 10A is a perspective view showing the rotor whose two magnetic component portions are combined with each other in the axial direction, and FIG. 10B is a perspective view showing the rotor whose two magnetic component portions are arranged at an appropriate vacant spacing in the axial direction;

FIG. 13A is a perspective view showing the rotor whose two magnetic component portions are combined with each other in the axial direction, and FIG. 13B is a perspective view showing the rotor whose two magnetic component portions are arranged at an appropriate vacant spacing in the axial direction;

DETAILED DESCRIPTION OF THE PREFERRED EMBODIMENTS

Figure 1:
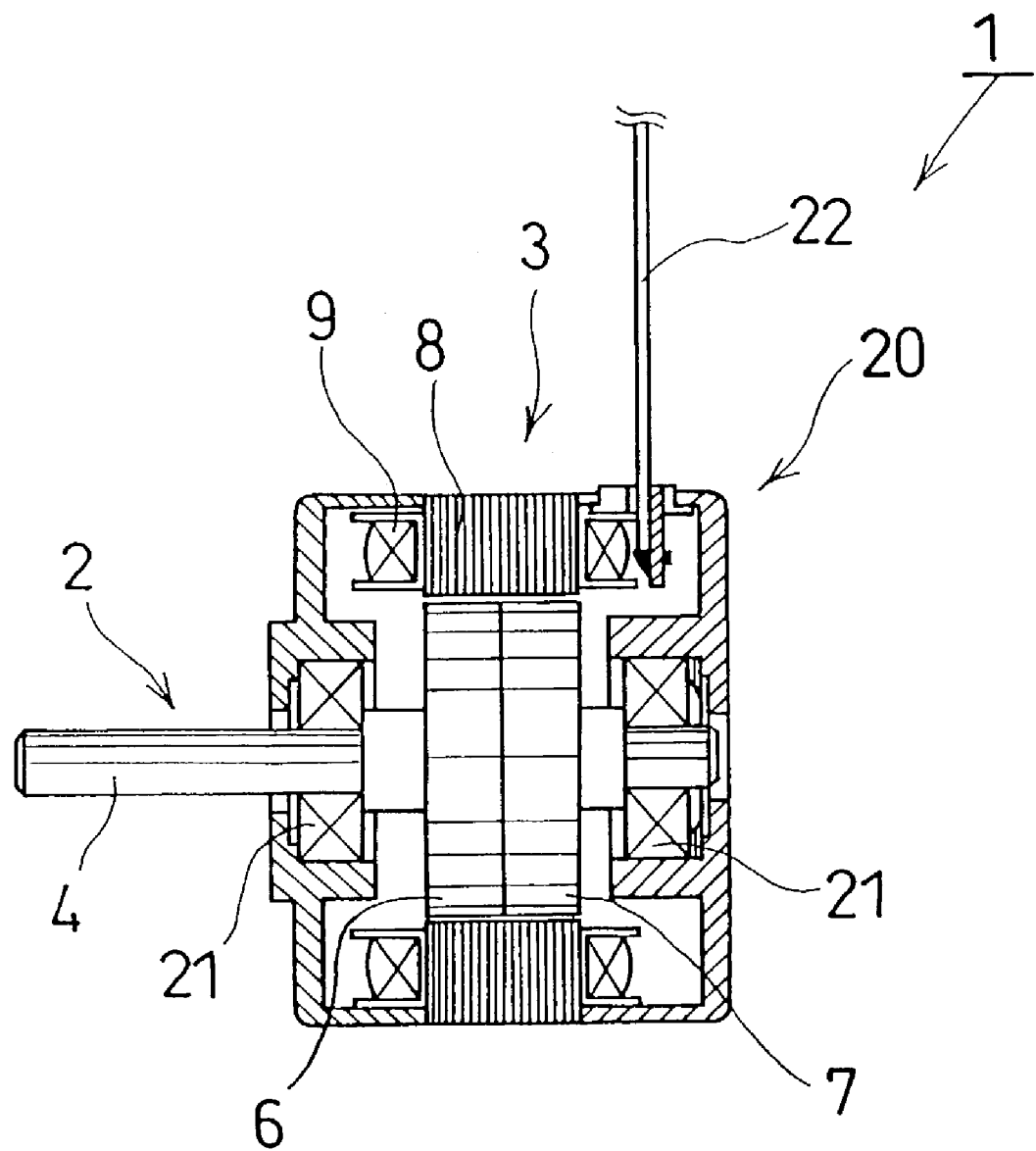
FIG. 1 is a sectional view showing a stepping motor according to a first embodiment of the present invention.

Referring to FIGS. 1 to 3, a first embodiment of the present invention is described as follows.

A stepping motor referred to as the first embodiment of the present invention has a stator 3 equipped in a housing 20, and enables a rotor 2 to rotate around a bearing 21 as shown in FIG. 1, and the rotor 2 comprises mainly a rotor axis 4 capable of rotating freely as being held by the bearing 21, and a magnetic component 5 that held by the rotor 4 by means of supporting portions (not shown) as shown in FIG. 2.

Figure 2A:
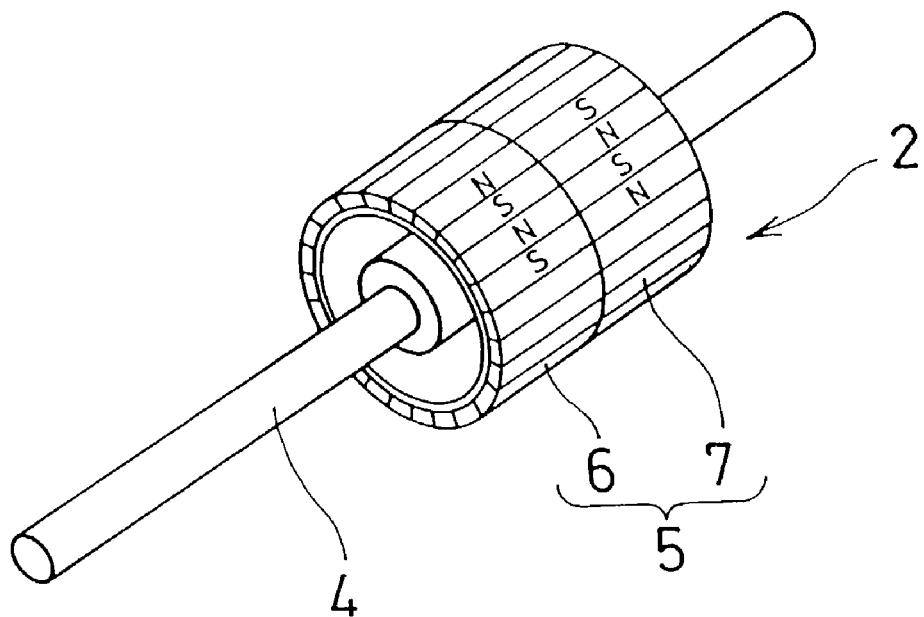
FIGS. 2A and 2B show a rotor of the stepping motor in FIG. 1.
Figure 2B:
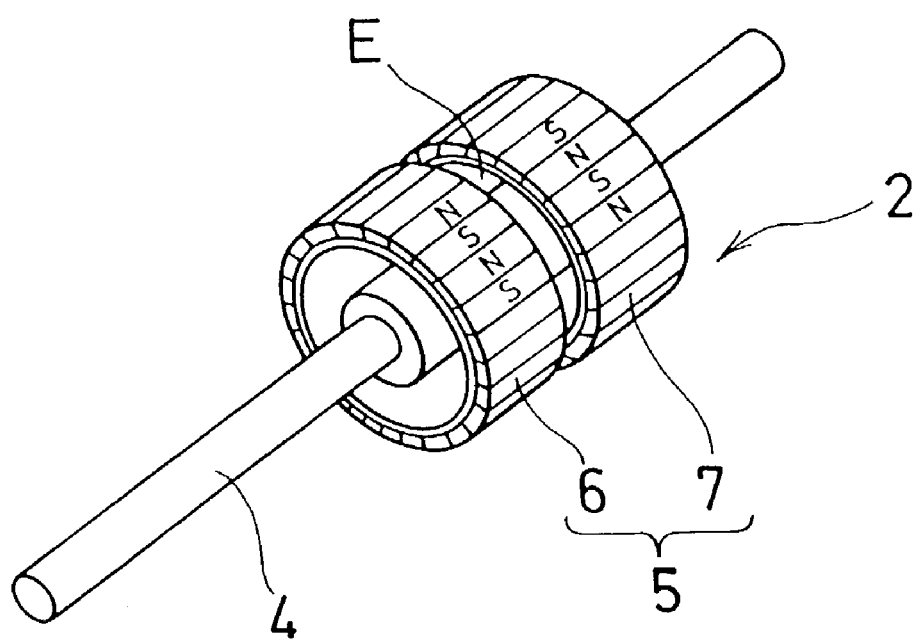

The magnetic component 5 comprises magnetic component portions 6 and 7 each shaped as an approximate ring. With regard to the magnetic component portions 6 and 7, it is possible that both of them are so fabricated that both of them are either combined firmly with each other in the axial direction as shown in FIG. 2A, or arranged separately at an appropriate vacant spacing inbetween in the axial direction as shown in FIG. 2B. For the convenience, hereinafter with regard to the magnetic component portions 6 and 7, the portion located at the left hand in FIGS. 2A and 2B is called a first magnetic component portion 6 and the other one at the right hand a second magnetic component portion 7.

At the respective circumferential surfaces of the first and second magnetic component portions 6 and 7, N-poles and S-poles are arranged and magnetized alternately. In this instance, the first and second magnetic component portions 6 and 7 are either combined with each other in the axial direction, or disposed at a predetermined spacing E, and before and after that arrangement the magnetic component portions are magnetized.

In this instance, the N-poles and S-poles of the first and second magnetic component portions 6 and 7 are arranged so that contrary poles face each other. In other words, an N-pole of the first magnetic component portion 6 is juxtaposed next to an S-pole of the second component portion 7 when viewed from the viewing angle along the axis 4 of the rotor.

Figure 3A:
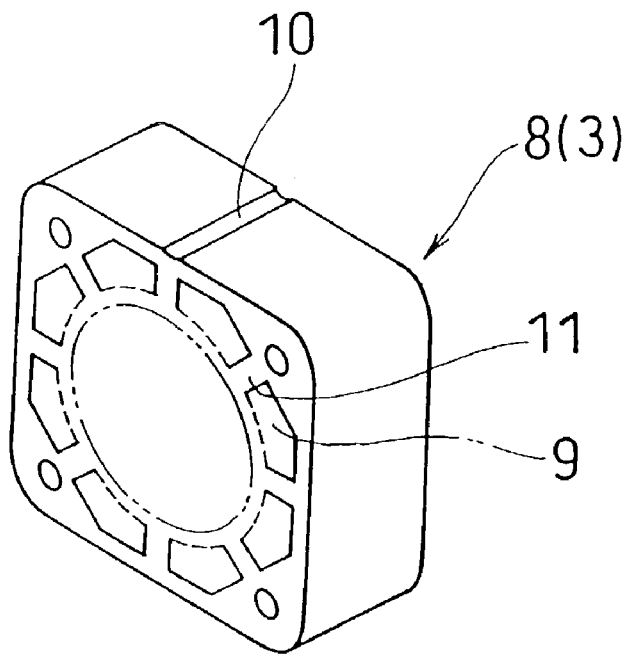
FIGS. 3A and 3B show a stator yoke.
Figure 3B:
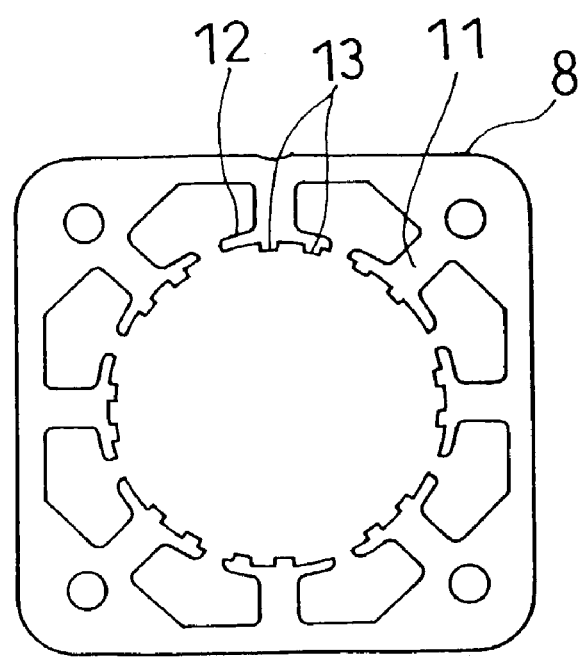

As shown in FIGS. 3A and 3B, the stator 3 comprises an approximate-rectangular stator yoke 8 having a hole (whose reference numeral is omitted) at its central part, through which the rotor 2 is inserted, and a coil 9 is wound around the stator yoke 8. The coil 9 is connected with lead wire 22 to an electric circuit (not shown). The stator yoke 8 comprises a laminated sheet made of a plurality of thin steel plates.

A magnetic salient portion 12 is provided at the top of each leg 11 of the core located inside the stator yoke 8, and the magnetic salient portion 12 is facing towards the coil 9. A plurality of teeth 13 (two teeth identified in this embodiment) are formed on the circumferential surface of the magnetic salient portion 12 around the circular surface of the magnet salient portion 12. A gap (whose reference numeral is omitted) is formed between the teeth 13 and the rotor 2.

Furthermore, the stator 3 can be comprised of first and second stator yoke components 14 and 15 capable of being incorporated in, respectively (see FIG. 4 concerning a second embodiment of the present invention described herein later), and the first and second stator yoke components are so arranged that the two yoke components are displaced with angle of either 90° or 180° with each other.

The coils 9 are provided correspondingly for the first and second magnetic component portions 6 and 7, and capable of producing magnetic force (both attractive and repulsive) between the coil 9 and the first magnetic component portion 6, and also between the coil 9 and the second magnetic component portion 7. The first and second magnetic component portions 6 and 7 are so arranged that contrary poles oppose each other in terms of their physical structure.

The magnetic component 5 of the rotor 2 described beforehand in the first embodiment takes a ring formation so that the distribution curve of the magnetic flux density in the magnetic field is of sine wave. Hence the motor gives less vibration and noises than that have teeth on the circumferential surface of the rotor, and furthermore it has smaller inertia and thus able to perform with much faster response.

As the magnetic component 5 is composed of the combination of the first and second magnetic component portions 6 and 7 (see FIG. 2A), each portion is able to receive magnetic force independently, thus resulting in good controllability of the motor as applied with two-phase type. As the magnetic component 5 comprises first and second magnetic component portions 6 and 7, a preferable magnetizing apparatus can be designed on the basis of the first and second magnetic component portions 6 and 7, thus the magnetizing apparatus should be smaller and hence the entire manufacturing equipment can be made smaller than before.

Figure 4A:
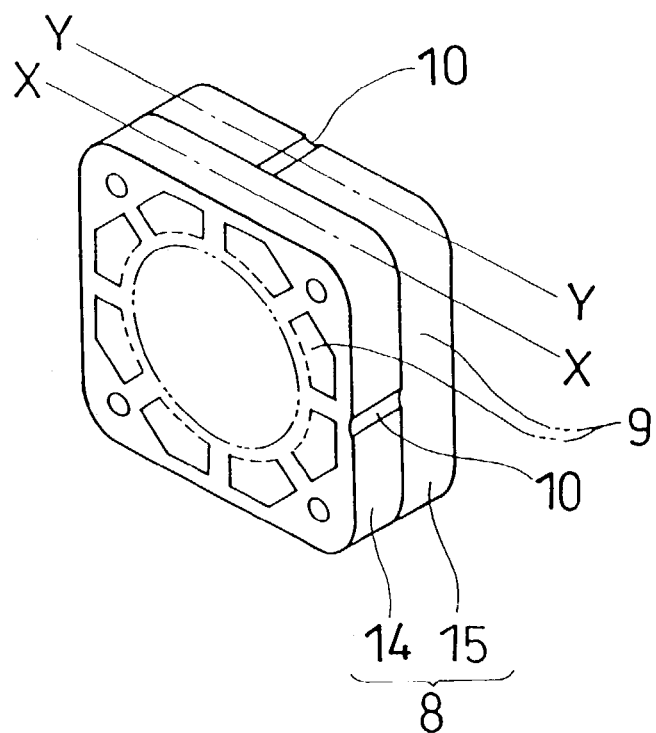
FIGS. 4A, 4B and 4C show a stator yoke according to a second embodiment of the present invention.
Figure 4B:
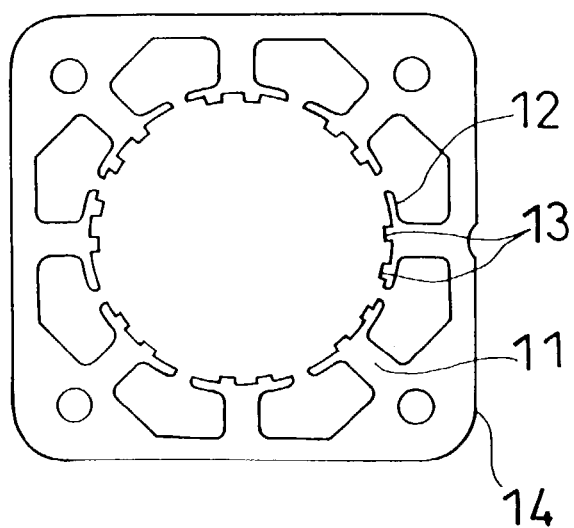
Figure 4C:
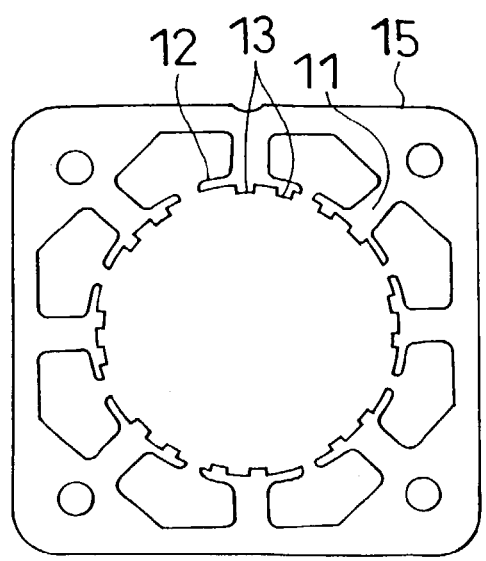
Figure 5:
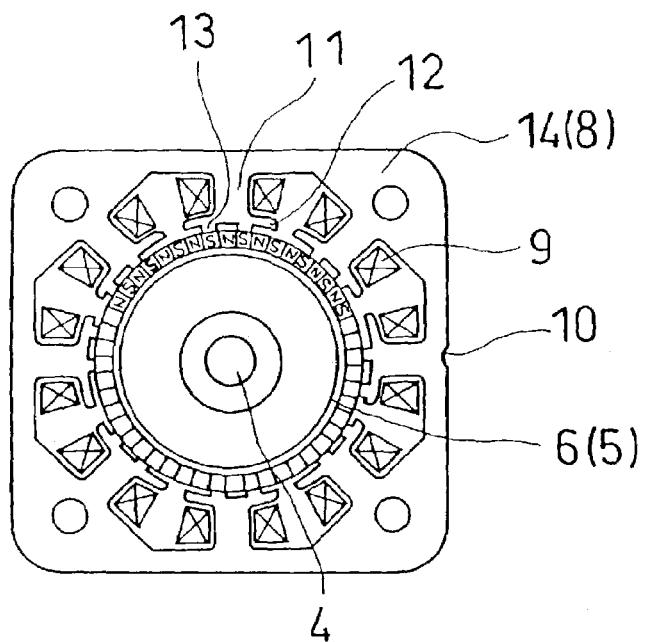
FIG. 5 is a sectional view of the stator and the rotor taken along the line X—X in FIG. 4A.
Figure 6:
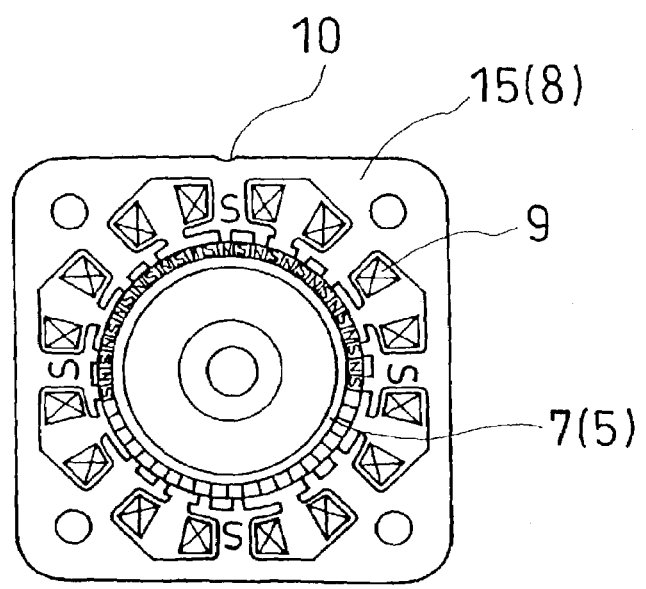
FIG. 6 is a sectional view of the stator and the rotor taken along the line Y—Y in FIG. 4A.

Referring now to FIGS. 4 to 6, a second embodiment of the present invention is described as follows.

With regard to the second embodiment, the stator yoke 8 of the stator 3 is composed of two stator yoke components 14 and 15, which can be combined with each other. For the convenience, hereinafter with regard to the stator yoke components 14 and 15, the portion located at the left hand in FIG. 4A is called a first stator yoke component 14 and the other one at the right hand a second stator yoke component 14. The first and second stator yoke components 14 and 15 comprise a laminated sheet made of plural thin steel plates in the same size.

Since the first and second stator yoke components 14 and 15 are so arranged that the two components are arranged in aberrant position displaced each other by angle of either 90° or 180°, and with regard to the first and second magnetic component portions 6 and 7, they are arranged so that contrary poles oppose each other in terms of physical structure, this type of stepping motor proves itself to be more controllable with two-phase type, just as described in the first embodiment of the present invention.

As similar to the first embodiment, in the second embodiment stated above, this type of stepping motor according to the present invention is capable of preventing undesired vibration and noises, rotating with faster speed, being more controllable with two-phase type, making the manufacturing equipment smaller, and thus reducing the manufacturing cost.

With regard to the second embodiment of the present invention, the steel plates can be prepared with only one type of die, because the first and second stator yoke component portions 14 and 15 are made of a plurality of thin steel plates in the same size, thus the manufacturing equipment can be simpler.

In examples of the first and second embodiment of the present invention, each shape of the first and second magnetic component portions 6 and 7 is of a ring, however, instead of ring shape, an approximate gear shape is also applicable for the first and second magnetic component portions 6 and 7 as shown in FIG. 7 (as a third embodiment) or FIG. 8 (as a fourth embodiment).

Figure 7A:
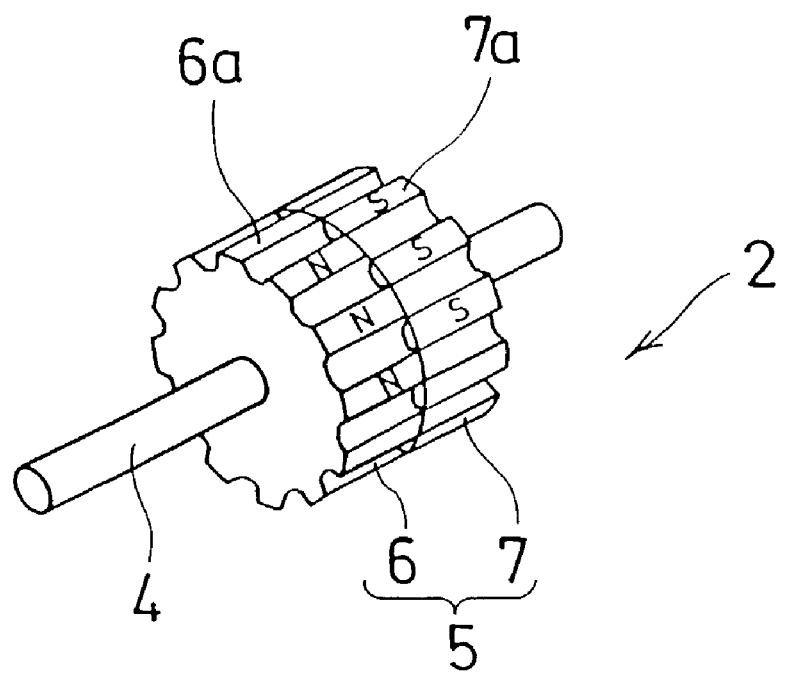
FIGS. 7A and 7B show a rotor according to a third embodiment of the present invention.
Figure 7B:
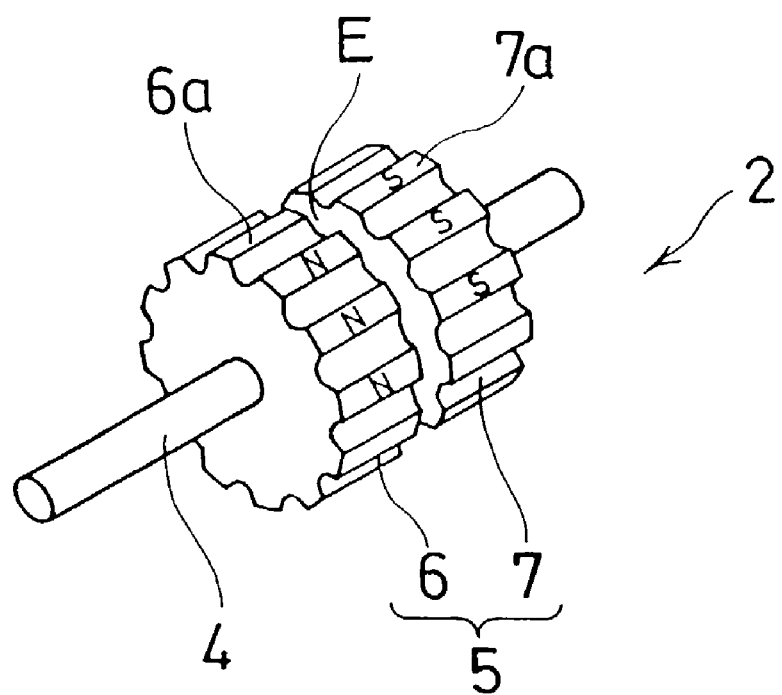
Figure 8A:
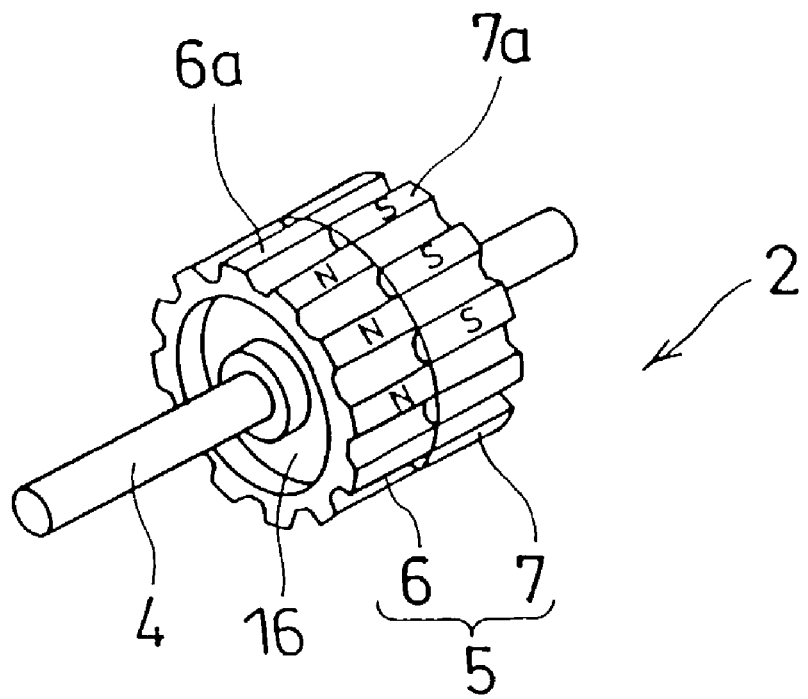
FIGS. 8A and 8B show a rotor according to a fourth embodiment of the present invention.
Figure 8B:
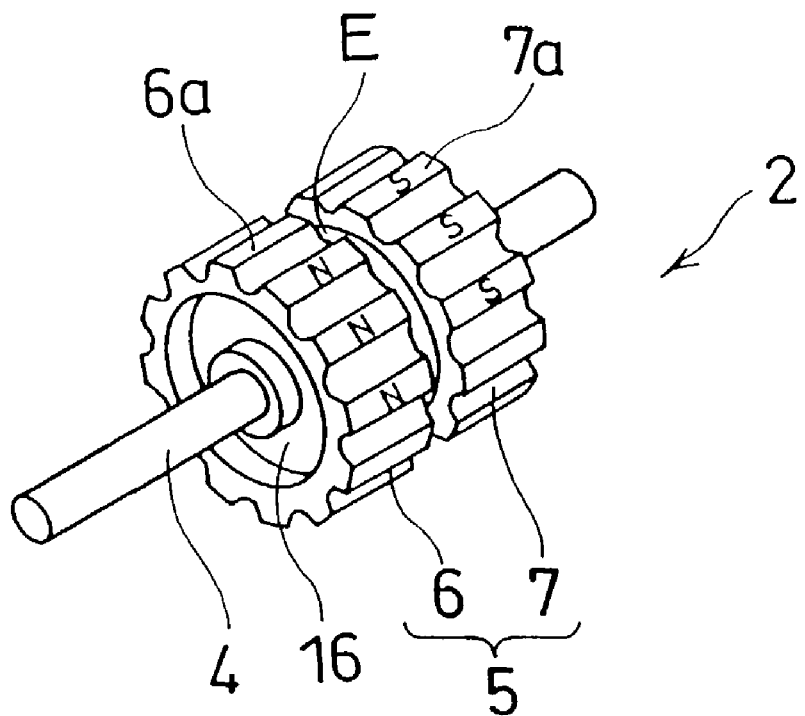
Figure 9A:
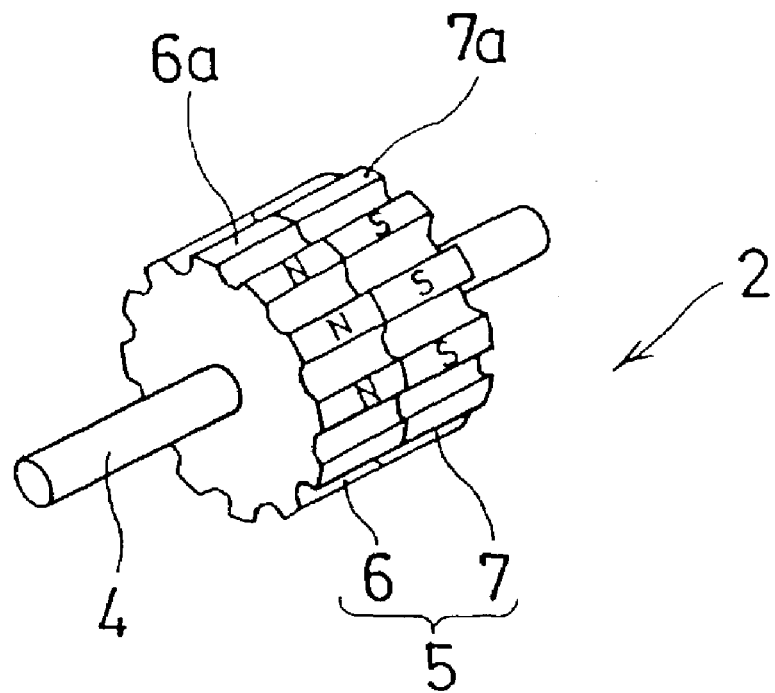
FIGS. 9A and 9B show a rotor according to a fifth embodiment of the present invention.
Figure 9B:
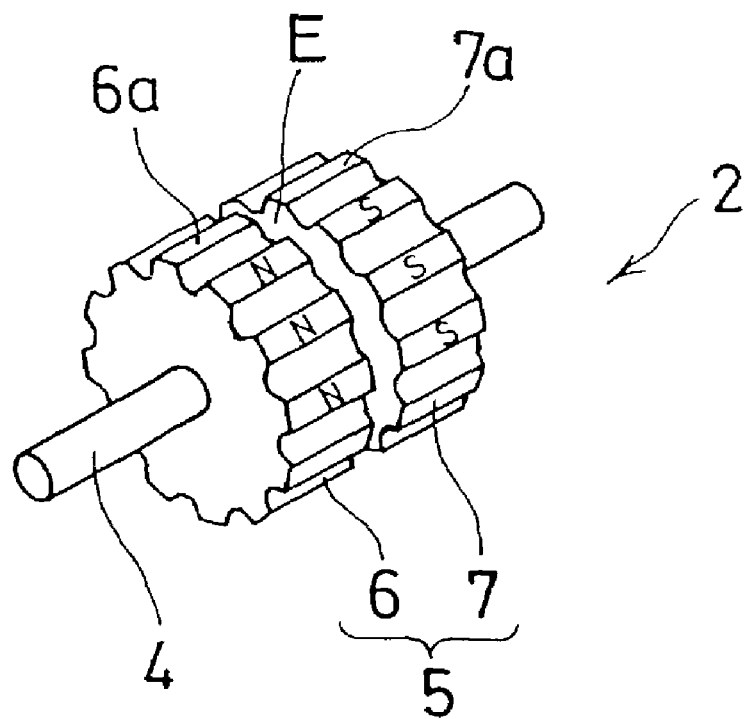
Figure 10A:
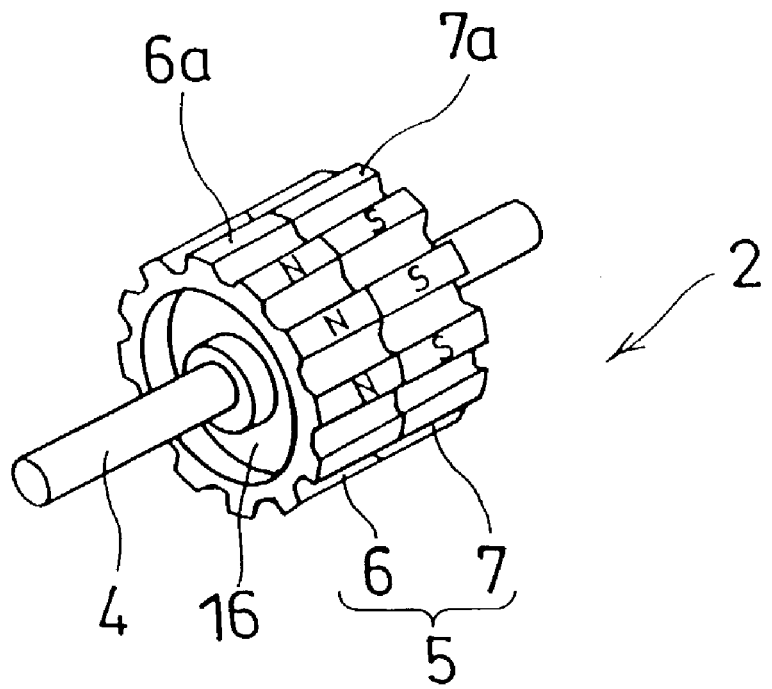
FIGS. 10A and 10B show a rotor according to a sixth embodiment of the present invention.
Figure 10B:
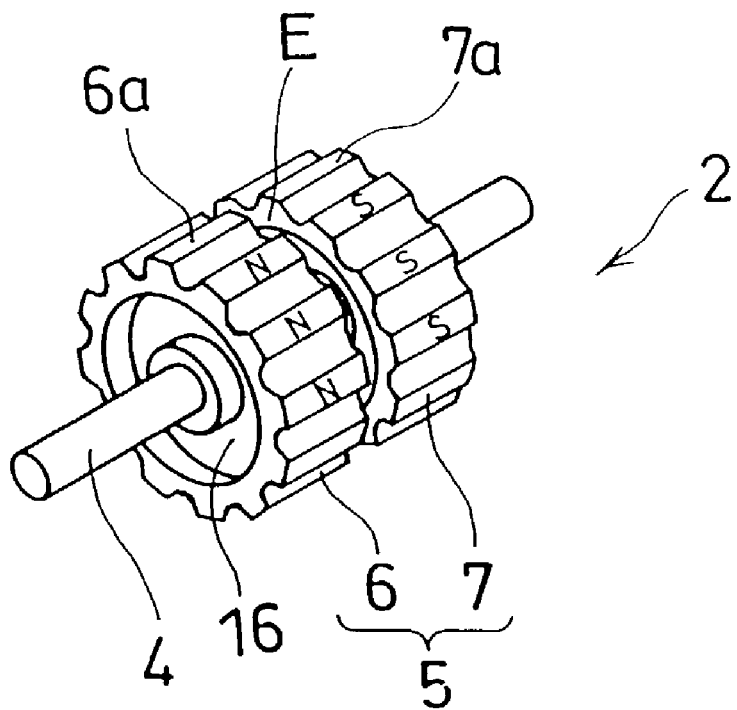
Figure 11:
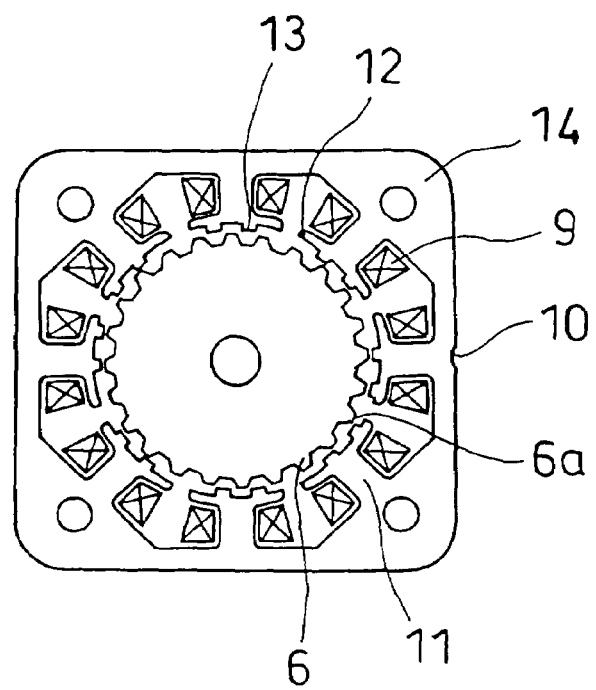
FIG. 11 is a sectional view showing the rotor in FIG. 9 or 10 and a stator used for the rotor.
Figure 12:
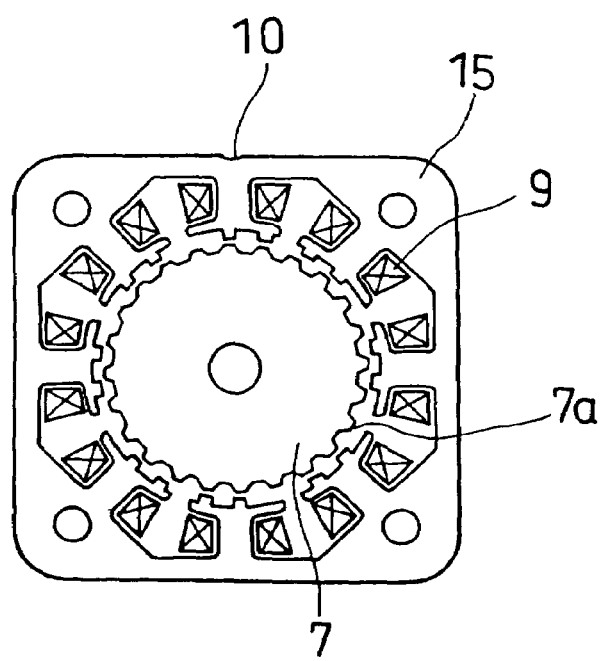
FIG. 12 is a sectional view showing the rotor in FIG. 9 or 10 and a stator used for the rotor.
Figure 13A:
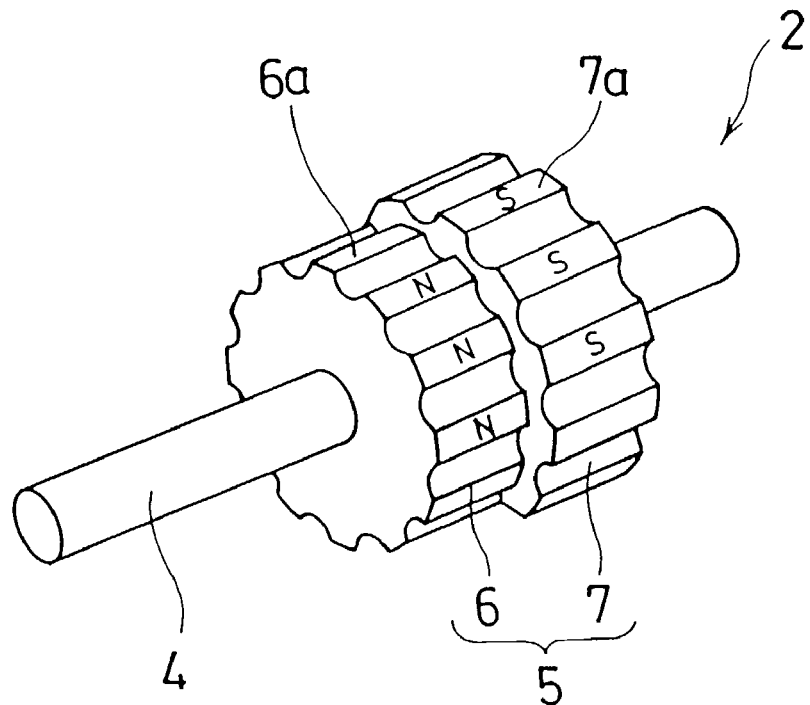
FIGS. 13A and 13B show a rotor of the stepping motor according to a seventh embodiment of the present invention.
Figure 13B:
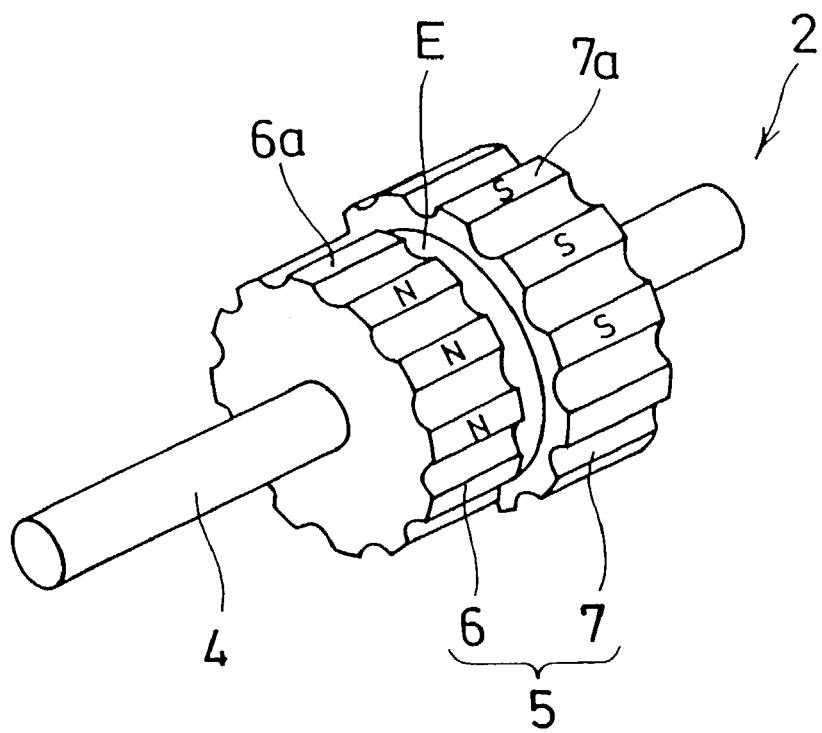
Figure 14A:
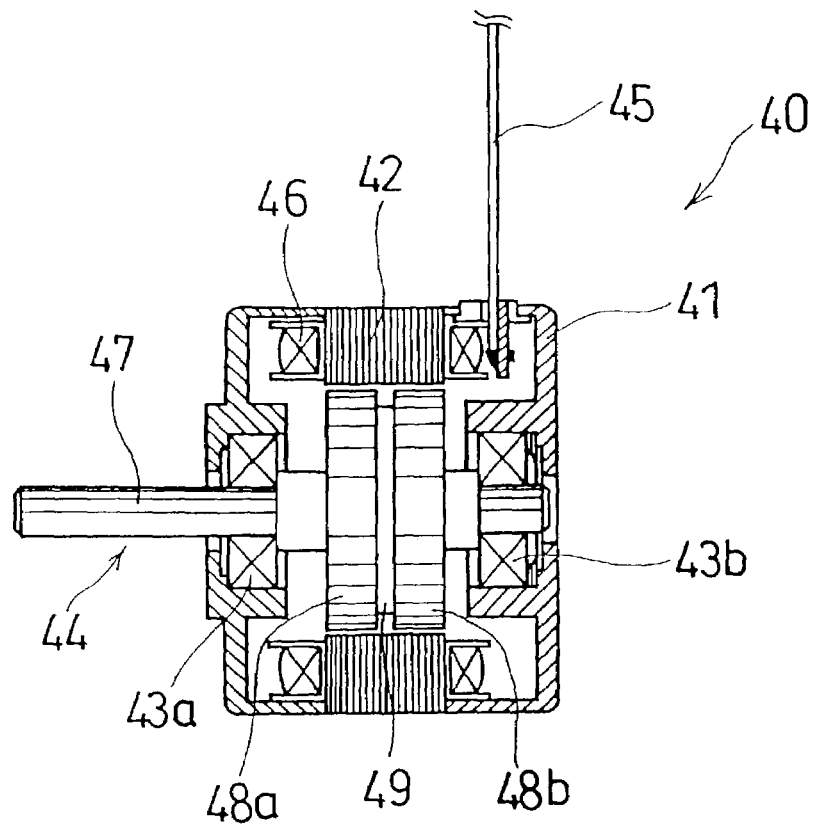
FIG. 14A is a sectional view showing a conventional stepping motor.
Figure 14B:
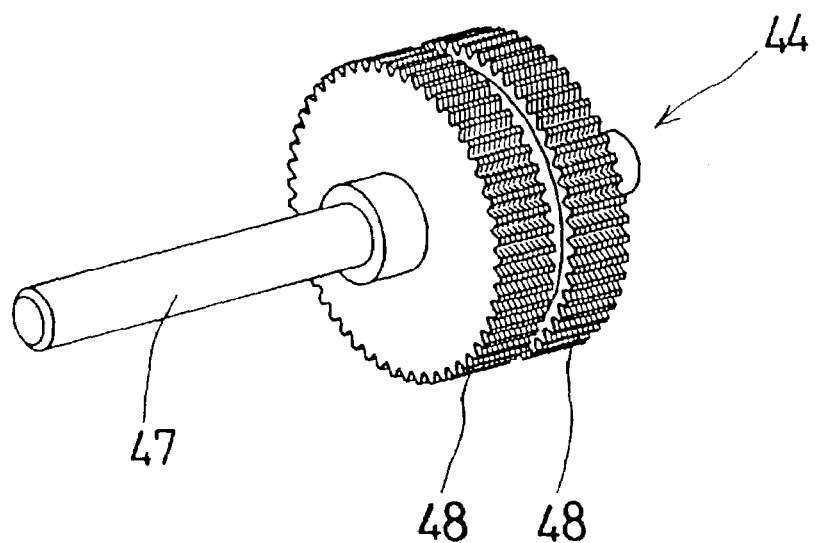
FIG. 14B is a perspective view showing a rotor in the stepping motor in FIG. 14A.

With regard to the third embodiment (see FIGS. 7A and 7B), the first and second magnetic component portions 6 and 7 can be either combined with each other in the axial direction as shown in FIG. 7A, or arranged at an appropriate vacant spacing in-between in the axial direction as shown in FIG. 7B. Such the construction principle is also applied for the fourth embodiment of the present invention (see FIGS. 8A and 8B) in the same manner, and corresponding constructions are shown in FIGS. 8A and 8B, respectively. This concept of the constructions is the same in the fifth (see FIGS. 10A and 10B) and the sixth (see FIGS. 13A and 13B) embodiments of the present invention, and each corresponding construction is shown separately in FIGS. 9, 11 and 13.

In the third embodiment, the first and second magnetic component portions 6 and 7 have convex portions 6a and 7a, having a lengthy rectangular physique, formed in the axial direction at appropriate spacing being like an approximate gear on the circumferential surface of each portion as shown in FIGS. 7A and 7B. The convex portion 6a of the first magnetic component portion 6 and the convex portion 7a of the magnetic component portion 7 are magnetized in the radial direction, so that contrary poles face each other when viewed in the axial direction. In this embodiment, for example, the convex portion 6a of the first magnetic component portion 6 is magnetized as N-pole, and the convex portion 7a of the magnetic component portion 7 as S-pole.

The first and second magnetic component portions 6 and 7 are combined or disposed at a predetermined spacing E in the axial direction, and the convex portions 6a and 7a are arranged so that a convex portion opposes a concave portion. In other words, the convex portion 6a (N-pole) of the first magnetic component portion 6 is juxtaposed next to a reentrant (concave) portion (whose reference numeral is omitted) between two convex portions 7a (S-pole) of the second magnetic component portion 7, and the first and second magnetic component portions are combined in the axial direction (FIG. 7A), or disposed at a predetermined spacing E (FIG. 7B).

The third embodiment of the present invention is capable of doing a fine control over the motor performance with two-phase type, and also constructing of a smaller manufacturing equipment is possible by the same reason for the first and second embodiments of the present invention.

With regard to the fourth embodiment of the present invention, slightly different from the third embodiment, it has modification that circular reentrant (concave) portions 16 are formed at either side of the combined portion of the first and second magnetic component portions, as shown in FIGS. 8A and 8B.

The fourth embodiment of the present invention is capable of rotating much faster than the third embodiment because now that it is lighter as the circular reentrant (concave) portion 16 is formed at either side of the combined portion of the first and second magnetic component portions.

In the third and fourth embodiments of the present invention, the convex portions 6a and 7a on the first and second magnetic component portions 6 and 7 are formed in positions, and either combined or disposed at a predetermined spacing E, however, it is also possible that the convex portions 6a and 7a are aligned in series (more specifically, the convex portion 6a (N-pole) of the magnetic component portion 6 is aligned with convex portion 7a (S-pole) of the magnetic component portion 7 in series in the axial direction), and both magnetic component portions are either combined each other or disposed at a predetermined spacing E.

Like the third embodiment, the fifth embodiment of the present invention is capable of doing a fine control over the motor performance with two-phase type, and also constructing a smaller manufacturing equipment is possible.

Furthermore, like the fourth embodiment, the sixth embodiment of the present invention is capable of rotating much faster than before because now that it is lighter as the circular reentrant (concave) portion 16 is introduced into either side of the combined portion of the first and second magnetic component portions 6 and 7.

In the third to sixth embodiments, the rotors are exemplified wherein the diameter of the first magnetic component portion 6 which includes the convex portion 6a is the same as that of the second magnetic component 7 which includes the convex portion 7a, however, instead it is possible that the diameter of the first magnetic component portion 6 is different from that of the second magnetic component portion 7 (a seventh embodiment of the present invention).

According to the first and second aspects of the present invention, the magnetic component comprises two magnetic component portions magnetized in multipole on their circumferential surfaces, being either combined with each other or disposed at a predetermined spacing, and shaped as an approximate ring. Thus, the distribution curve of magnetic flux in the magnetic field is of sine wave, which means that this type of stepping motor prevents undesired vibration and noises more than other types that have teeth on the circumferential surfaces of their rotors. The type of stepping motor according to the present invention has a smaller inertia and faster-response ability because the magnetic component in the rotor is ring-like.

Since the magnetic component comprises two magnetic component portions being either combined with each other or arranged at an appropriate spacing, and the respective portions are capable of receiving magnetic force independently, thus resulting in better performance with regard to controllability with the two-phase type. In addition, the magnetizing apparatus can be smaller on the basis of the physical size of the two magnetic component portions, because the magnetic component comprises two magnetic component portions, thus constructing a smaller sized manufacturing equipment is possible.

According to the third to fifth aspects of the present invention, the magnetic component comprises two magnetic component portions being either combined with each other or arranged at an appropriate spacing, and the respective portions are capable of receiving magnetic force independently, thereby resulting in better performance with regard to controllability with the two-phase type. The magnetizing apparatus can be smaller on the basis of the physical size of the two magnetic component portions, because the magnetic component comprises two magnetic component portions. Thus, it is possible to construct a smaller sized manufacturing equipment.

What is claimed is:

1. A structure of a stepping motor, comprising:
   a stator; and
   a rotor comprising a magnetic component magnetized in its radial direction, said stepping motor being capable of forcing said rotor to rotate by magnetic force provided between magnetic poles of said rotor and excited salient poles of the stator, wherein
   a stator yoke of the stator is composed of a first stator yoke component and a second stator yoke component combined with each other in an axial direction,
   the first and second stator yoke components are arranged so that the two components are arranged with each other in a circumferential direction by an angle of either 90° or 80° and are made of a plurality of thin steel plates,
   a magnetic salient portion is provided inside the stator yoke, and a plurality of teeth are formed on the circumferential inner surface of the magnetic salient portion, and
   said magnetic component comprises:
      two magnetic component portions each shaped as an approximate gear, said two magnetic component portions have, on their circumferential surface, convex portions that extend in the axial direction and are disposed at appropriate spacing, said two magnetic component portions are either combined with each other or set up separately at appropriate spacing between them, and circular reentrant portions are formed at either side of the combined portion of said two magnetic component portions.

2. The structure of the rotor in the stepping motor according to claim 1, wherein said convex portions are radially magnetized in a manner of a plurality of N-poles and S-poles arranged alternately and said convex portions on one magnetic component portion have the opposite pole to said convex portions on the other magnetic component portion, and are in aligned arrangement when viewed in the axial direction.

3. The structure of the rotor in the stepping motor according to claim 1 wherein said convex portions are radially magnetized in a manner of a plurality of N-poles and S-poles arranged alternately,
   and said convex portions on one magnetic component portion to concave portions on the other magnetic portion are in aligned arrangement when viewed in the axial direction.

* * * * *

UNITED STATES PATENT AND TRADEMARK OFFICE
CERTIFICATE OF CORRECTION

PATENT NO.   : 6,958,556 B2
DATED        : October 25, 2005
INVENTOR(S)  : Soichi Kurosawa, Akio Kanazawa and Naohiro Yoshida It is certified that error appears in the above-identified patent and that said Letters Patent is hereby corrected as shown below:

Column 8,
Line 4, delete "90° or 80° and are made of a plurality of thin steel" replace with
-- 90° or 180° and are made of a plurality of thin steel --.

Signed and Sealed this

Twenty-eighth Day of February, 2006

JON W. DUDAS
*Director of the United States Patent and Trademark Office*